US 12,516,916 B2

(12) United States Patent
Fukushima et al.

(10) Patent No.: US 12,516,916 B2
(45) Date of Patent: Jan. 6, 2026

(54) GAS GENERATOR

(71) Applicant: Daicel Corporation, Osaka (JP)

(72) Inventors: Akira Fukushima, Tokyo (JP); Shinya Yamamoto, Tokyo (JP); Narumi Mizuta, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/676,520

(22) Filed: May 29, 2024

(65) Prior Publication Data

US 2024/0310150 A1    Sep. 19, 2024

Related U.S. Application Data

(63) Continuation of application No. PCT/JP2022/026196, filed on Jun. 30, 2022.

(30) Foreign Application Priority Data

Nov. 30, 2021  (JP) ................................. 2021-194864

(51) Int. Cl.
*F42B 3/04*  (2006.01)
*F42B 3/10*  (2006.01)

(52) U.S. Cl.
CPC . *F42B 3/04* (2013.01); *F42B 3/10* (2013.01)

(58) Field of Classification Search
CPC ...................................................... F42B 3/10
USPC ............. 102/530–531, 202.5, 202.9, 202.12; 280/741, 736, 737
See application file for complete search history.

(56) References Cited

U.S. PATENT DOCUMENTS

| 6,244,623 | B1 * | 6/2001 | Moore ................ B60R 21/2644 280/741 |
| 7,338,073 | B2 * | 3/2008 | Nakayasu ............. B60R 21/268 280/741 |
| 8,590,930 | B2 * | 11/2013 | Mitsunabe .............. F42B 3/103 280/741 |
| 8,602,452 | B1 * | 12/2013 | VanHooser ........... B60R 21/274 280/737 |

(Continued)

FOREIGN PATENT DOCUMENTS

DE        20318387 U1    2/2004

OTHER PUBLICATIONS

CN 113365883 A and English Translation (Year: 2021).*

(Continued)

*Primary Examiner* — Reginald S Tillman, Jr.
(74) *Attorney, Agent, or Firm* — XSENSUS LLP (57) ABSTRACT

A gas generator includes an ignition device including an igniter, an igniter holding portion, and a fixing portion made of resin and a case having a bottomed tubular shape and being configured to accommodate a gas generating agent which combusts by actuation of the ignition device, the case made of resin and including a side wall portion with a base end side being connected to the fixing portion, and a closing end portion configured to close a tip end side. The closing end portion includes a fragile part configured to open by a combustion product generated by the gas generating agent, a periphery of the fragile part is greater in thickness than the fragile part, and an annular inclination portion is formed inside the case from a predetermined position of the side wall portion to the fragile part.

15 Claims, 4 Drawing Sheets

(56) References Cited

U.S. PATENT DOCUMENTS

2002/0062757 A1    5/2002  Vetter
2006/0103123 A1*   5/2006  Myers ................... B60R 21/268
                                                         280/736

OTHER PUBLICATIONS

International Search Report and Written Opinion maled on Sep. 20, 2022, received for PCT Application PCT/JP2022/026196, filed on Jun. 30, 2022, 11 pages including English Translation.
Supplementary European Search Report mailed Oct. 13, 2025, in European Application No. 22900843.8, 9 pages.

* cited by examiner

GAS GENERATOR

TECHNICAL FIELD

The present invention relates to a gas generator.

BACKGROUND ART

There is a proposal of a known gas generator including an outer housing having a receiving part having a cup shape and a cover closing the receiving part (e.g., Patent Document 1). In the present technique, the receiving part and the cover are made of resin and form an airtight housing that is protected from moisture ingress. In the gas generator of the present technique, during operation, the gas generating agent in the cover combusts to increase the pressure in the cover, and a part of the cover ruptures to discharge the gas.

CITATION LIST

Patent Document

Patent Document 1: US 2002/0062757 A

SUMMARY OF INVENTION

Technical Problem

In the gas generator, in a case where the case for accommodating the gas generating agent is made of resin, the resin generally has a breaking strength smaller than that of metal, and thus there is a high possibility that fragments thereof are scattered at the time of rupture of the case. Patent Document 1 above does not disclose any configuration or the like for suppressing scattering of fragments at the time of rupture of the case.

An object of the present disclosure is to provide a technique for suppressing scattering of a case at the time of rupture when the resin case is used.

Solution to Problem

To solve the above problem, the present disclosure adopts the following configuration.

A gas generator including:
  an ignition device including an igniter, an igniter holding portion having a tubular shape and being configured to hold the igniter in a state of surrounding the igniter, and a fixing portion made of resin and being configured to fix the igniter to the igniter holding portion; and
  a case having a bottomed tubular shape and being configured to accommodate a gas generating agent which combusts by actuation of the ignition device, the case being made of resin and including a side wall portion with a base end side being connected to the fixing portion, and a closing end portion configured to close a tip end side, in which
  the closing end portion includes a fragile part configured to open by a combustion product generated by the gas generating agent,
  a periphery of the fragile part is greater in thickness than the fragile part, and
  an annular inclination portion is formed inside the case from a predetermined position of the side wall portion to the fragile part.

In the gas generator described above, the fragile part may be formed at a radial center part of the closing end portion of the case, and
  the fragile part may be positioned on an extension of a tip end part of the annular inclination portion.

In the gas generator described above, the fragile part may be a flat portion formed at the tip end part of the annular inclination portion.

Furthermore, in the gas generator described above, the fragile part may be a recessed part formed outside a closing end surface of the case.

Furthermore, in the gas generator described above, a contour of an inner peripheral surface of the case at a boundary part between the annular inclination portion and the side wall portion may be a curved line in a longitudinal section of the case.

Furthermore, in the gas generator described above, the case may have a columnar shape and is fitted to a tubular portion that is an attachment target of the gas generator.

The above-described configurations can be combined or deleted as much as possible without departing from the gist of the present disclosure.

Advantageous Effects of Invention

According to the present disclosure, it is possible to provide a technique for suppressing scattering of a case at the time of rupture when the resin case is used.

DESCRIPTION OF EMBODIMENTS

A gas generator according to an embodiment of the present disclosure will be described below with reference to the drawings. Note that each of configurations, combinations thereof, and the like in the embodiments are an example, and various additions, omissions, substitutions, and other changes of the configurations may be made as appropriate without departing from the spirit of the present disclosure. The present disclosure is not limited by the embodiments and is limited only by the claims.

First Embodiment

Figure 1:
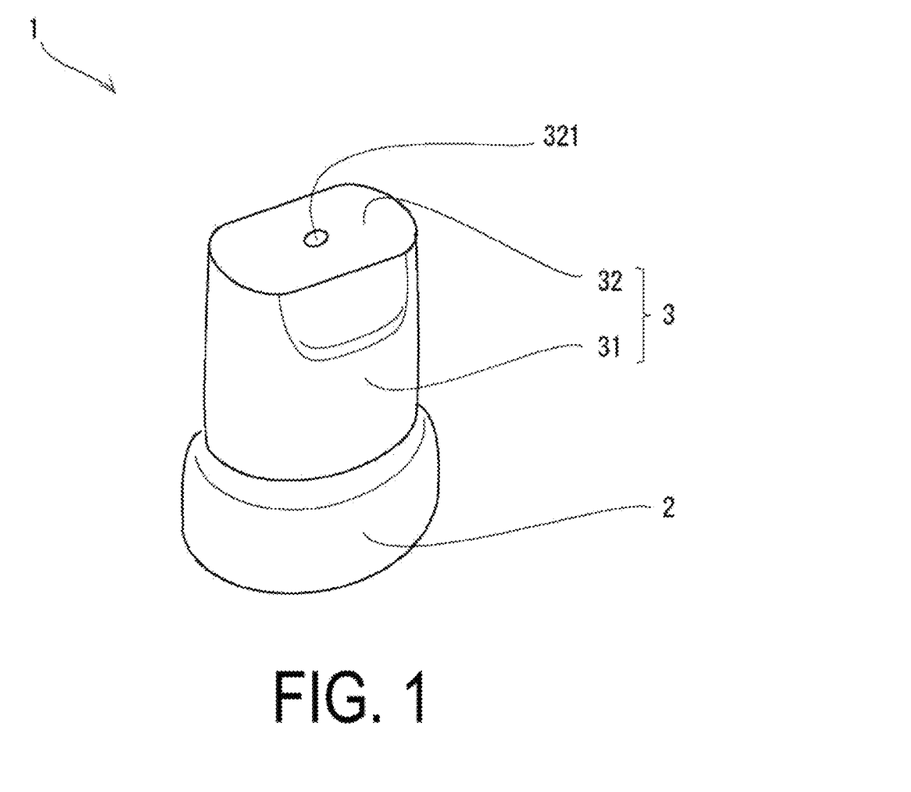
FIG. 1 is a perspective view illustrating an example of a gas generator according to a first embodiment.
Figure 2:
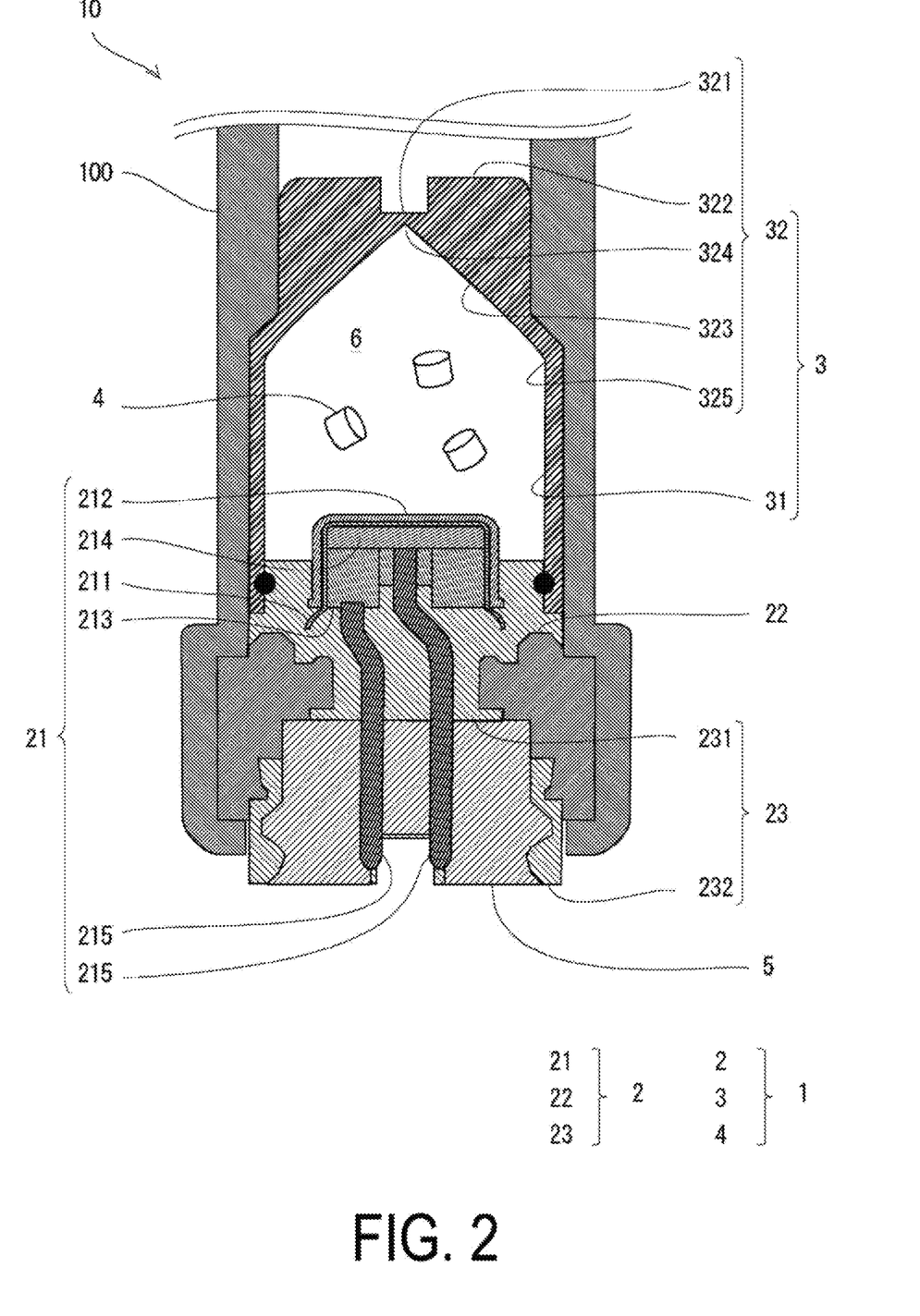
FIG. 2 is an axial schematic cross-sectional view illustrating an example of the gas generator attached to an attachment target according to the first embodiment.

FIG. 1 is a perspective view illustrating an example of a gas generator. FIG. 2 is an axial schematic cross-sectional view illustrating an example of the gas generator attached to an attachment target. When operated, a gas generator 1 causes an internal gas generating agent to combust and to release a generated combustion gas to the outside. As illustrated in FIG. 2, the gas generator 1 is incorporated in, for example, a seat belt retractor (pretensioner) 10 of an automobile, and is used to wind up a seat belt in the event of collision of the automobile. The gas generator 1 includes an ignition device 2 and a case 3, and internally accommodates a gas generating agent 4.

Ignition Device

The ignition device 2 includes an igniter 21 that ignites by an ignition current, an igniter holding portion 22 supporting the igniter 21, and a fixing portion 23 interposed between the igniter 21 and the igniter holding portion 22.

The igniter 21 includes, for example, a cup body 211 having a bottomed tubular shape with one end opened, an insulating layer 212, a sealing member 213 closing an opening portion of the cup body 211, an ignition charge 214 accommodated in an ignition chamber formed by the cup body 211 and the sealing member 213, and two electro-conductive pins 215 for receiving supply of a current from the outside. Note that in the present embodiment, for convenience, the cup body 211 side will be described as an upper side, and the electro-conductive pin 215 side will be described as a lower side. The two electro-conductive pins 215 are connected via a bridge wire (not illustrated) in the ignition chamber. When the electro-conductive pin 215 is supplied with a current from the outside, the bridge wire that is a resistor generates heat to combust the ignition charge 214. Note that as the ignition charge 214, an existing ignition charge used in a general gas generator can be adopted. The cup body 211 is a member made of metal covered with the insulating layer 212 made of resin, for example. The sealing member 213 is also made of metal, for example, and the two electro-conductive pins 215 are insulated from each other. The cup body 211 has a radial notch (not illustrated) on the upper surface, for example, and is ruptured by a combustion product of the ignition charge 214 to release the combustion product such as flame or combustion gas upward when the igniter 21 is in operation.

The igniter holding portion 22 is, for example, a metal collar supporting the side of the igniter 21. That is, the igniter holding portion 22 is a member made of metal formed in a tubular shape, and holds the igniter 21 inside thereof. Note that to suppress circumferential rotation of the fixing portion 23 with respect to the igniter holding portion 22, an inner peripheral surface of the igniter holding portion 22 in contact with the fixing portion 23 may be provided with recesses and protrusions. The igniter holding portion 22 is fixed, by crimping, to a tubular portion 100 that is an attachment target, which is a seat belt retractor body, for example. The tubular portion 100 is a tubular member into which the case 3 of the gas generator 1 can be inserted.

The fixing portion 23 is a connection portion made of resin that is interposed between the igniter 21 and the igniter holding portion 22 by injection molding and that fixes the igniter 21 to the igniter holding portion 22. As a material of the fixing portion 23, a resin material having excellent heat resistance, durability, corrosion resistance, and the like after curing can be suitably used. In the example of FIG. 2, the fixing portion 23 includes a first fixing portion 231 that is positioned on the upper side and fixes the cup body 211 and the like of the igniter 21, and a second fixing portion 232 that is positioned on the lower side and mainly surrounds the electro-conductive pin 215. The fixing portion 23 covers the periphery of the side of the igniter 21, and thus, for example, a part of the cup body 211 or the insulating layer 212 is in a state of being exposed from the fixing portion 23. Note that the entirety of the cup body 211 or the insulating layer 212 may be overmolded by the fixing portion 23. By being engaged with the inside of the igniter holding portion 22, the fixing portion 23 fixes the igniter 21 to the igniter holding portion 22. The second fixing portion 232 may fix, inside the igniter holding portion 22, a connector 5 for supplying the electro-conductive pin 215 with power from an external power source in a state of being connected to the electro-conductive pin 215.

Case

The case 3 is a bottomed tubular member extending from the base end side (ignition device 2 side) toward the tip end side (upper side) in a manner that the case 3 surrounds the upper portion of the ignition device 2. The material of the case 3 is resin, and may be, for example, the identical resin to that of the fixing portion 23. The case 3 includes a side wall portion 31 having a tubular shape extending vertically and a closing end portion 32 closing an upper end. A combustion chamber 6 accommodating the gas generating agent 4 is formed between the case 3 and the igniter 21. The gas generating agent 4 is ignited by the operation of the igniter 21 and combusted to generate a combustion product such as combustion gas.

The side wall portion 31 is a tubular portion whose inner diameter and outer diameter are constant or substantially constant. The base end side of the side wall portion 31 is connected to the fixing portion 23 by full circumference welding, for example. The full circumference welding is annular welding continuous in the circumferential direction, and refers to closing two members of the welding target without a gap. In the example of FIG. 2, parts to be welded by laser welding are indicated by black circles.

The closing end portion 32 is formed to have an elliptical shape or a rounded rectangular shape in cross section in a direction orthogonal to the axial direction of the case 3. The closing end portion 32 includes a fragile part 321 that ruptures by, for example, an increase in the internal pressure of the case 3 or the temperature of the combustion product generated by combustion of the gas generating agent 4, and a thick part 322 greater in thickness than the fragile part 321. As illustrated in FIG. 2, the outer surface of the closing end portion 32 has a recessed part having a predetermined shape near the center thereof, and the bottom of the recessed part is the fragile part 321. An annular inclination portion 323 in which the cross-sectional area of a tube gradually decreases toward the tip end is formed on an inner surface of the closing end portion 32, and the tip end of the annular inclination portion 323 converges to a vertex 324 positioned on the back surface of the fragile part 321. That is, an internal space of the case 3 has a tip end part thereof with a cavity having a conical shape. Therefore, when the internal pressure of the case 3 increases, stress concentrates on the vertex 324. The base end side of the annular inclination portion 323 is connected to the inner surface of the side wall portion 31 via a bent part 325. Note that the bent part 325 may be formed in a curved surface shape from the annular inclination portion 323 to the side wall portion 31 (i.e., the boundary part between the annular inclination portion 323 and the side wall portion 31 may be formed in a curved surface shape), and thus stress is not concentrated when the internal pressure of the case 3 increases.

The outside of a side surface of the case 3 has a shape along the inside of the tubular portion 100, which is the attachment target. That is, the side wall portion 31 is accommodated in a part of the tubular portion 100 where an inner periphery of the cross section is a perfect circle or a substantially perfect circle. The closing end portion 32 is accommodated in a part of the tubular portion 100 where the inner periphery of the cross section is an elongated hole shape or a rounded rectangular shape. Since the side surface of the case 3 is surrounded over the entire circumference by the tubular portion 100, which is the attachment target, and the inner surface of the attachment target has a shape corresponding to the side surface of the case 3, rupture of the side surface of the case 3 is suppressed even when the internal pressure of the case 3 increases. The inner diameter of the part having the elongated hole shape or the rounded rectangular shape is smaller in a predetermined direction than the inner diameter of the part having the perfect circle or the substantially perfect circle. Since parts where the outer diameter of the case 3 is smaller on the tip end side than on the base end side are formed as flat portions at two locations facing the closing end portion 32 side of the case 3, the tubular portion 100 also complementarily faces the flat portions, and therefore, when the internal pressure of the case 3 increases, upward ejection of the case 3 is suppressed. Therefore, when the internal pressure of the case 3 increases, or when the case 3 melts due to the temperature of the combustion product generated by combustion of the gas generating agent 4, the fragile part 321 of the closing end portion 32 first ruptures to form an opening. Rotation of the gas generator 1 in the tubular portion 100 is also prevented.

Gas Generating Agent

As the gas generating agent 4, a predetermined gas generating agent is used. The combustion temperature of the gas generating agent 4 is from 1000° C. to 1700° C., for example. The gas generating agent 4 is formed of, for example, guanidine nitrate (41 wt. %), basic copper nitrate (49 wt. %), a binder, and additives. As the individual shape of the gas generating agent 4, a single hole columnar shape can be used. However, the gas generating agent 4 is not limited to that described above, and a nitrocellulosic composition can also be used.

Operation

In a state where the gas generator 1 is assembled to a seat belt retractor 10 of an automobile, for example, the connector 5 is connected to the two electro-conductive pins 215, and power can be supplied to the igniter 21. In this state, when a sensor (not illustrated) mounted on the automobile or the like senses an impact, the electro-conductive pin 215 is supplied with an ignition current, and the igniter 21 is operated. The igniter 21 causes the ignition charge 214 in the cup body 211 to combust, and thus the combustion product is released to the outside of the cup body 211. The gas generating agent 4 filled in the combustion chamber 6 is ignited by flame or combustion gas that is a combustion product of the ignition charge 214. By being combusted, the gas generating agent 4 generates combustion gas or the like as a combustion product.

Since the side surface of the case 3 is surrounded over the entire circumference by the tubular portion 100, which is the attachment target, and the inner surface of the attachment target has a shape corresponding to the side surface of the case 3, rupture of the side surface of the case 3 is suppressed even when the internal pressure of the case 3 increases. Since the outer diameter of the case 3 includes a part where the tip end side is smaller than the base end side, when the internal pressure of the case 3 increases, upward ejection of the entirety of the case 3 is suppressed. Therefore, when the internal pressure of the case 3 increases, or when the case 3 melts due to the temperature of the combustion product generated by combustion of the gas generating agent 4, the fragile part 321 of the closing end portion 32 solely ruptures to form an opening. At this time, scattering of a part of the case 3 other than the fragile part 321 is suppressed in the form of small pieces. The fragile part 321 to rupture is sufficiently smaller than the cross section of the closing end portion 32, and even if fragments are generated, the fragments are combusted out by the combustion product of the gas generating agent 4, and therefore the fragments of the case 3 are suppressed from entering the inside of the attachment target.

From the opening, the combustion gas is discharged into the seat belt retractor that is an attachment target, for example. Then, the discharged combustion gas causes a predetermined mechanism of the seat belt retractor to operate. Note that as the seat belt retractor, an existing configuration can be adopted. For example, the gas generator 1 is connected to one end of a pipe that is a part of the seat belt retractor and moves a steel ball in the pipe by the pressure of combustion gas. The gear is rotated by the moving steel ball, and the seat belt retractor applies the seat belt with pretension by winding the seat belt using the rotation of the gear as a power. At this time, since the gas generator 1 has one fragile part 321 at the center of the closing end portion 32, the flow direction of the gas discharged in the direction in which the pipe extends can be concentrated, and the force can be efficiently transmitted to the seat belt retractor.

Second Embodiment

Figure 3:
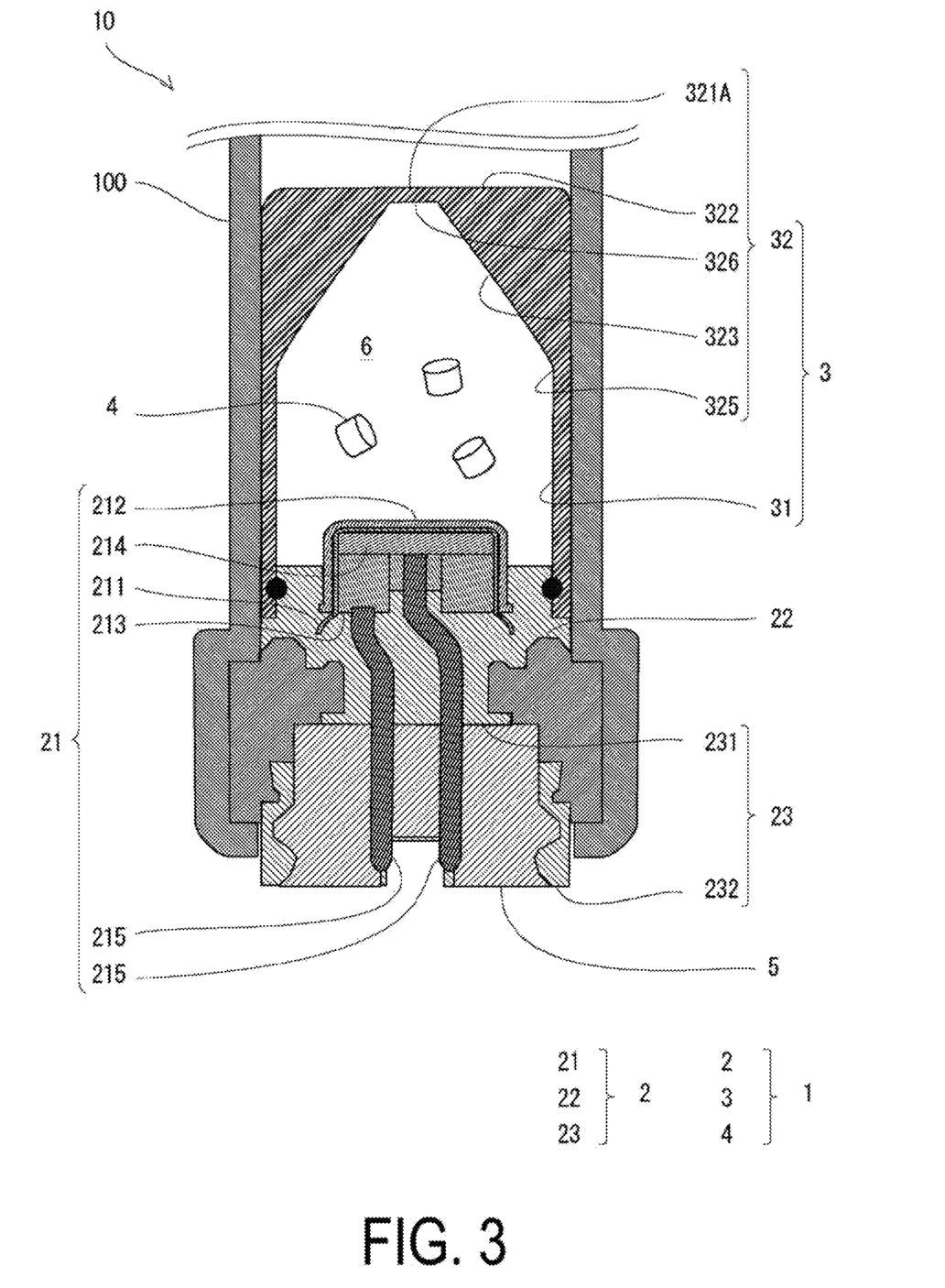
FIG. 3 is a schematic cross-sectional view illustrating an example of a gas generator according to a second embodiment.

FIG. 3 is a schematic cross-sectional view illustrating an example of the gas generator according to the second embodiment. Note that constituent elements corresponding to the constituent elements in the first embodiment described above are given the identical reference signs, and the description will be omitted.

A fragile part 321A of the case 3 according to the present embodiment is common to that of the first embodiment in that the fragile part is formed on an extension of the tip end of the annular inclination portion 323 provided inside the case 3 and is thinner than the thick part 322 in a periphery. However, the internal space of the case 3 has a tip end part thereof with a cavity having a truncated cone shape, and a tip end 326 of the annular inclination portion 323 is planar. The outside of the closing end portion 32 of the case 3 is flush.

Note that in the example of FIG. 3, an outer periphery of the side surface of the case 3 is also flush, but as illustrated in FIGS. 1 and 2, the cross section of the tip end part of the case 3 may have an elliptical shape or a rounded rectangular shape with its diameter being small in a predetermined direction.

Also in such a gas generator 1, since the side surface of the case 3 is surrounded over the entire circumference by the tubular portion 100, which is the attachment target, and the inner surface of the attachment target has a shape corresponding to the side surface of the case 3, rupture of the side surface of the case 3 is suppressed even when the internal pressure of the case 3 increases. Therefore, when the internal pressure of the case 3 increases, or when the case 3 melts due to the temperature of the combustion product generated by combustion of the gas generating agent 4, the fragile part 321A of the closing end portion 32 solely ruptures to form an opening. At this time, scattering of a part of the case 3 other than the fragile part 321A is suppressed in the form of small pieces. The fragile part 321A to rupture is sufficiently smaller than the cross section of the closing end portion 32, and combusted out by the combustion product of the gas generating agent 4, and the fragments of the case 3 are suppressed from entering the inside of the attachment target.

Comparative Example

Figure 4:
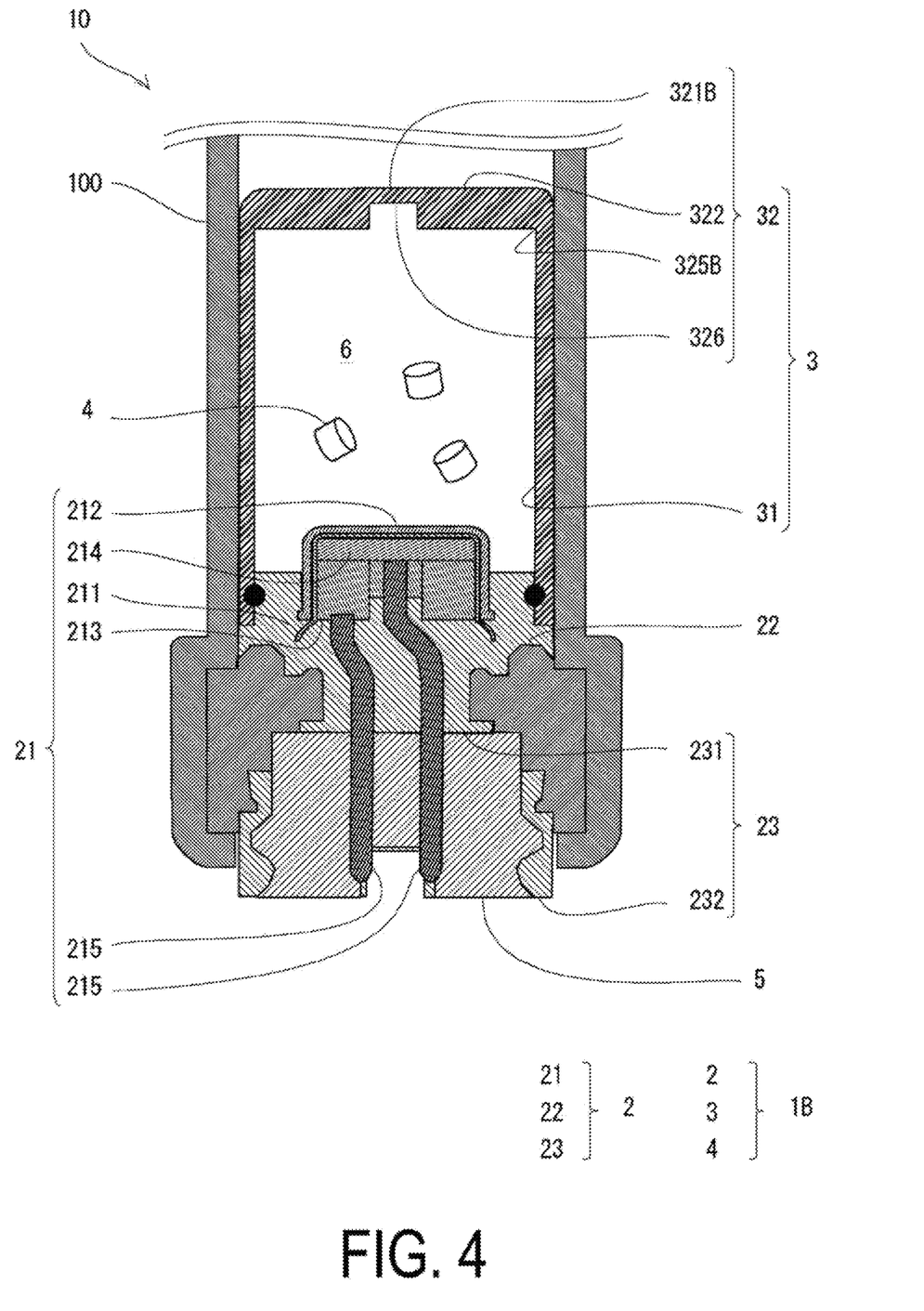
FIG. 4 is a schematic cross-sectional view illustrating an example of a gas generator according to a comparative example.

FIG. 4 is a schematic cross-sectional view illustrating an example of the gas generator according to the comparative example. Note that constituent elements corresponding to the constituent elements in the first and second embodiments described above are given the identical reference signs, and the description will be omitted.

In the example of FIG. 4, the annular inclination portion 323 is not included, and the internal space of the case 3 has a columnar shape over the entire length. A recessed part is formed at the center inside the closing end portion 32, and the tip end 326 of the recessed part forms a fragile part 321B thinner than the thick part 322 in the periphery. When the case 3 does not include the annular inclination portion 323, stress is also concentrated on a bent part 325B formed between the side wall portion 31 and the closing end portion 32. Therefore, not only does the fragile part 321B rupture, but also the closing end portion 32 is radially torn from the fragile part 321B, and the closing end portion 32 is easily inflated outward by about 90 degrees about the bent part 325B. When the closing end portion 32 is open outward by about 90 degrees, the bent part 325B may possibly be further torn and fragments of the closing end portion 32 are scattered.

On the other hand, when the internal pressure of the case 3 increases, the annular inclination portion 323 illustrated in the first embodiment and the second embodiment receives a force directed to the side of the case 3 rather than the tip end direction of the case 3. However, since the tubular portion 100, which is an attachment target, surrounding the side of the case 3 suppresses inflation of the closing end portion 32 about the bent part 325, it is possible to suppress scattering of the closing end portion 32 in the form of fragments.

Other

Each aspect disclosed in the present specification can be combined with any other feature disclosed herein. For example, in the first embodiment, the tip end of the annular inclination portion 323 may be an end surface as illustrated in the second embodiment. In the second embodiment, also the outside of the closing end portion 32 may be further provided with a recessed part as described in the first embodiment. In the second embodiment, the tip end 326 of the annular inclination portion 323 may be the vertex 324 as described in the first embodiment. In the above embodiment, the contour of the annular inclination portion 323 in a longitudinal section of the gas generator 1 need not be a straight line, and a slight curved line may be formed as long as the thick part 322 is secured.

REFERENCE SIGNS LIST 1, 1B Gas generator
2 Ignition device
21 Igniter
211 Cup body
212 Insulating layer
213 Sealing member
214 Ignition charge
215 Electro-conductive pin
22 Igniter holding portion
23 Fixing portion
231 First fixing portion
232 Second fixing portion
3 Case
31 Side wall portion
32 Closing end portion
321, 321A, 321B Fragile part
322 Thick part
323 Annular inclination portion
324 Vertex
325, 325B Bent part
326 Tip end
4 Gas generating agent
5 Connector
6 Combustion chamber
10 Seat belt retractor
100 Tubular portion (attachment target)

The invention claimed is:

1. A gas generator, comprising:
an igniter;
an igniter holding portion having a tubular shape and being configured to hold the igniter in a state of surrounding the igniter;
a fixing portion made of resin and being configured to fix the igniter to the igniter holding portion; and
a case having a bottomed tubular shape and being configured to accommodate a gas generating agent which combusts by actuation of the igniter, the case being made of resin and including a side wall with a base end side being connected to the fixing portion, and a closing end configured to close a tip end side, wherein
the closing end includes a fragile part configured to open by a combustion product generated by the gas generating agent,
a periphery of the fragile part is greater in thickness than the fragile part,
an annular inclination portion is formed inside the case from a predetermined position of the side wall to the fragile part, and
a contour of an inner peripheral surface of the case at a boundary between the annular inclination portion and the side wall is a curved line in a longitudinal section of the case.

2. The gas generator according to claim 1, wherein
the fragile part is formed at a radial center part of the closing end of the case, and
the fragile part is positioned on an extension of a tip end of the annular inclination portion.

3. The gas generator according to claim 1, wherein
the fragile part is a flat portion formed at a tip end of the annular inclination portion.

4. The gas generator according to claim 1, wherein
the fragile part is a recessed part formed outside a closing end surface of the case.

5. The gas generator according to claim 1, wherein
the case has a columnar shape and is fitted to a tubular portion that is an attachment target of the gas generator.

6. The gas generator according to claim 2, wherein
the fragile part is a flat portion formed at the tip end of the annular inclination portion.

7. The gas generator according to claim 2, wherein
the fragile part is a recessed part formed outside a closing end surface of the case.

8. The gas generator according to claim 3, wherein
the fragile part is a recessed part formed outside a closing end surface of the case.

9. The gas generator according to claim 2, wherein
the case has a columnar shape and is fitted to a tubular portion that is an attachment target of the gas generator.

10. The gas generator according to claim 3, wherein
the case has a columnar shape and is fitted to a tubular portion that is an attachment target of the gas generator.

11. The gas generator according to claim 4, wherein
the case has a columnar shape and is fitted to a tubular portion that is an attachment target of the gas generator.

12. The gas generator according to claim 5, wherein
the case has a columnar shape and is fitted to a tubular portion that is an attachment target of the gas generator.

13. A gas generator, comprising:
an igniter;
an igniter holding portion having a tubular shape and being configured to hold the igniter in a state of surrounding the igniter;
a fixing portion made of resin and being configured to fix the igniter to the igniter holding portion; and
a case having a bottomed tubular shape and being configured to accommodate a gas generating agent which combusts by actuation of the igniter, the case being made of resin and including a side wall with a base end side being connected to the fixing portion, and a closing end configured to close a tip end side, wherein
the closing end includes a fragile part configured to open by a combustion product generated by the gas generating agent,
a periphery of the fragile part is greater in thickness than the fragile part,
an annular inclination portion is formed inside the case from a predetermined position of the side wall to the fragile part,
the fragile part is formed at a radial center part of the closing end of the case, and
the fragile part is positioned on an extension of a tip end of the annular inclination portion.

14. The gas generator according to claim 13, wherein
the fragile part is a recessed part formed outside a closing end surface of the case.

15. The gas generator according to claim 13, wherein
a contour of an inner peripheral surface of the case at a boundary between the annular inclination portion and the side wall is a curved line in a longitudinal section of the case.

* * * * *